(12) United States Patent
Euget et al.

(10) Patent No.: US 6,804,238 B1
(45) Date of Patent: Oct. 12, 2004

(54) SYSTEM AND METHOD FOR TRANSMITTING COMPRESSED FRAME HEADERS IN A MULTIPROTOCAL DATA TRANSMISSION NETWORK

(75) Inventors: Guy Euget, Vence (FR); Jacques Fieschi, St Laurent du Var (FR); Claude Galand, La Colle sur Loup (FR); Jean-François Le Pennec, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,802

(22) Filed: Dec. 28, 1999

(30) Foreign Application Priority Data

Dec. 29, 1998 (EP) .............................. 98480100

(51) Int. Cl.[7] .............................................. H04L 12/28
(52) U.S. Cl. ........................................ 370/392; 370/477
(58) Field of Search ................................. 370/392, 465, 370/477, 475

(56) References Cited

U.S. PATENT DOCUMENTS

| | | | | |
|---|---|---|---|---|
| 6,032,197 A | * | 2/2000 | Birdwell et al. | ............ 709/247 |
| 6,067,381 A | * | 5/2000 | Benayoun et al. | .......... 382/232 |
| 6,104,696 A | * | 8/2000 | Kadambi et al. | ........... 370/218 |
| 6,304,914 B1 | * | 10/2001 | Deo et al. | .................... 709/247 |
| 6,314,095 B1 | * | 11/2001 | Loa | ............................. 370/352 |
| 6,415,061 B1 | * | 7/2002 | Benayoun et al. | .......... 382/253 |

* cited by examiner

Primary Examiner—Chi Pham
Assistant Examiner—Keith M. George
(74) Attorney, Agent, or Firm—McguireWoods LLP; John R. Pivnichny

(57) ABSTRACT

A method for transmitting data frames with compressed headers in a multiprotocol data transmission network comprising at least one ingress node transmitting data to egress nodes. Each frame of data includes data bytes and a header which defines the transmission protocols. This method comprises the steps of comparing the address field of the frame to a list of address fields corresponding to the current flows of data, selecting candidate headers associated with flows having the same address, determining a compressed header based upon the position and the number of bytes that differ between the frame header and the candidate header, selecting as reference header the best candidate header based on compression ratio, and transmitting a compressed data frame wherein the data bytes are preceded by a reference label and a compressed header including a field defining the position and the number of consecutive bytes in the portion being compressed, a field including the different bytes, and a field including the portion of header which is not compressed.

23 Claims, 5 Drawing Sheets

SYSTEM AND METHOD FOR TRANSMITTING COMPRESSED FRAME HEADERS IN A MULTIPROTOCAL DATA TRANSMISSION NETWORK

TECHNICAL FIELD

The present invention relates generally to the compression of the headers of data frames transported within a data transmission network, and relates particularly to a protocol-independent method and corresponding system for transmitting compressed headers in a data transmission network.

BACKGROUND

The use of data transmission networks based upon packet switching has become increasingly important for a number of applications, including transmitting data within a delimited area such as a firm, a plant, or a building through Local Area Networks (LAN), and for transmitting data over long distances using Wide Area Networks (WAN).

Therefore, there is a growing interest in compressing the transmitted data frames in order to increase the data bandwidth, particularly in compressing the frame headers. Such compression reduces overhead, which can be very important when several layers and the associated protocols (IP, TCP, UDP . . . ) are used.

Up to now, efforts have been made to compress the headers of low or medium-speed links in networks based upon the IP protocol. Such compression can improve interactive response time because echoing characters may take longer than 100–200 ms due to the time required to transmit large headers. It can also enable the use of small packets for bulk data with good line efficiency, enable the use of small packets for delay sensitive low data-rate traffic, and reduce the packet loss rate since sending fewer bits per packet results in a lower packet loss rate for a given bit-error rate.

Headers that can be compressed include TCP, UDP, IPv4 and IPv6 base and extension headers. Header compression relies on many fields being constant or changing seldom in consecutive packets belonging to the same packet stream. Fields that do not change between packets need not be transmitted at all. Fields that change often with small and/or predictable values, e.g. TCP sequence numbers, can be encoded incrementally so that the number of bits needed for these fields decreases significantly. Only fields that change often and randomly, e.g. checksums or authentication data, need to be transmitted in every header.

A template is built for each kind of protocol header wherein only variable fields to be transmitted are included. When a flow of data from a source node to a destination node is initiated, the first frame is transmitted with a full packet. Then, for the subsequent frames, only compressed headers are transmitted. Each compressed header is built with the template associated with the protocol referring to the context established by the full header of the first frame and containing incremental changes to this context.

The method of compression mentioned above presents several inherent drawbacks. First, insofar as the compression processing consists of determining the bits which have changed with respect to the first uncompressed header, such processing is slow and cannot be used with today's high speed data transmission. Secondly, the headers used with the various protocols have specific structures which require the use of different templates which are each adapted to a specific protocol and which each require different processing.

Moreover, another drawback of present compression methods results from the appearance of more and more new protocols introduced in the networks which require implementation of new templates and processing for achieving the compression of the associated headers.

SUMMARY OF THE INVENTION

Accordingly, the main object of the invention is to achieve a new method for transmitting compressed frame headers of flows of data transmitted at high speed over a data transmission network irrespective of the protocol being used.

Another object of the invention is to achieve a new method for transmitting compressed frame headers based upon a byte to byte comparison with a reference header being the header of a frame pertaining to a flow of data irrespective of protocol.

Another object of the invention is to provide a new system enabling an ingress node to transmit compressed frame headers at high speeds over a data transmission network irrespective of the protocol being used.

Therefore, the invention relates to a method for transmitting data frames with compressed headers in a multiprotocol data transmission network comprising at least one ingress node and a plurality of switching nodes, wherein the ingress node transmits flows of data to at least one of the switching nodes used as egress nodes, each flow of data being frames that include data bytes and a header that includes information which defines protocols associated with the various layers involved in the flow of data.

This method comprises the steps of:
- comparing the address field of the frame with a list of address fields corresponding to the current flows of data each time a data frame is to be transmitted by the ingress node over the network to an egress node,
- selecting all the candidate headers that are associated with the flows of data having the same address field,
- determining a compressed header of the frame header for each of the candidate headers based upon the position and the number of bytes that differ between the frame header and the candidate header,
- selecting as reference header the one amongst the candidate headers for which the compressed header has the best compression ratio, and
- transmitting a compressed data frame wherein the data bytes of the data frame received by the ingress node are preceded by a reference label associated with the reference header and a compressed header including a field defining the position and the number of consecutive bytes in the portion being compressed which are different from the corresponding bytes of the reference header, a field including the different bytes, and a field including the portion of header not being compressed.

According to another aspect, the invention relates to a system for implementing the above method comprising address lookup means in the ingress node for comparing the address field of the data frame to be transmitted by the ingress node over the network with a list of address fields, a header buffer in which are selected all the candidate headers that are associated with the flows of data having the same address field, determining means for determining a compressed header of the frame header for each of the candidate headers based upon the position and the number of bytes that differ between the frame header and the candidate header, selecting means for selecting as reference header the candidate header for which the compressed header has the best compression ratio, and transmitting means for transmitting a compressed data frame wherein the data bytes of the data frame are preceded by a reference label associated with the reference header and a compressed header including a field defining the position and the number of consecutive bytes in the portion being compressed which are different from the bytes of the reference header, a field including the different bytes, and a field including the portion of the header which is not compressed.

BRIEF DESCRIPTION OF THE DRAWINGS

The above and other objects, features and advantages of the invention will be better understood by reading the following more particular description of the invention presented in conjunction with the accompanying drawings wherein:

FIGS. 5A, 5B and 5C represent formats of the data frame being respectively transmitted when the data frame is the first frame of a new flow of data, when the potential header is taken as a reference header, and when the header of a previous frame is taken as a reference header.

DETAILED DESCRIPTION OF THE INVENTION

Figure 1:
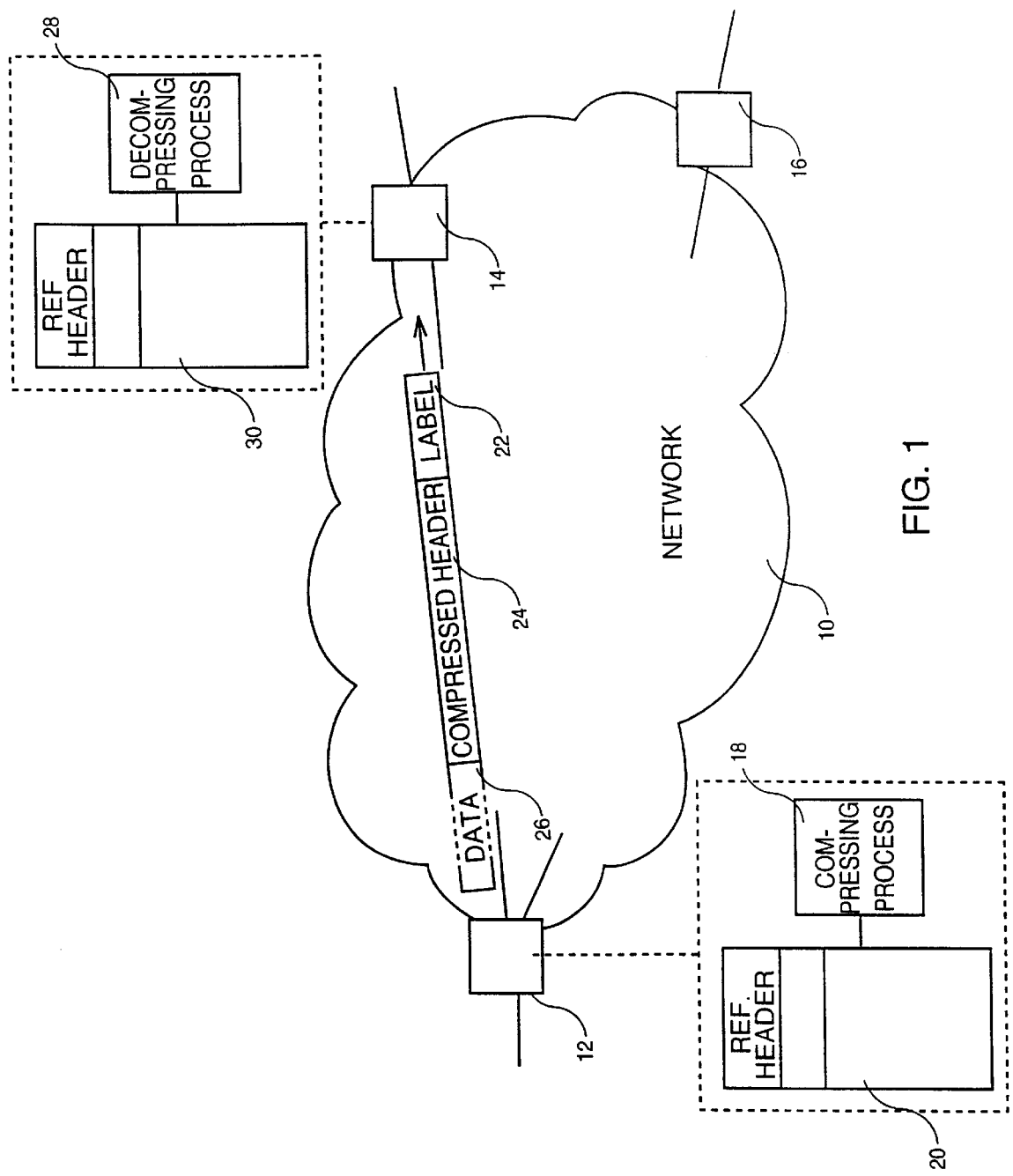
FIG. 1 represents schematically a data transmission network wherein a flow of data is established from an ingress node to an egress node, the ingress node being provided with means for compressing the frame headers according to the method of the invention and the egress node being provided with means for decompressing the frame headers received from the ingress node.

As illustrated in FIG. 1, a network 10 in which the invention can be used includes an ingress node 12 from which flows of data are transmitted over network 10 to egress nodes 14 or 16. As explained below, ingress node 12 is provided with a system wherein the header of a data frame is compressed using a compressing process 18, such a process being based upon the comparison, byte to byte, with reference headers stored in a buffer 20. The reference header being used in the compressing process is defined in a label such that the frame which is transmitted from ingress node 12 to egress node 14 is composed of such a label 22, the compressed header 24, and data 26.

When received by egress node 14, the frame is processed by a decompressing process 28 using label 22 to determine which reference header is being used, such a reference header being retrieved from a reference header buffer 30 identical to reference header buffer 20 of ingress node 12.

Figure 2:
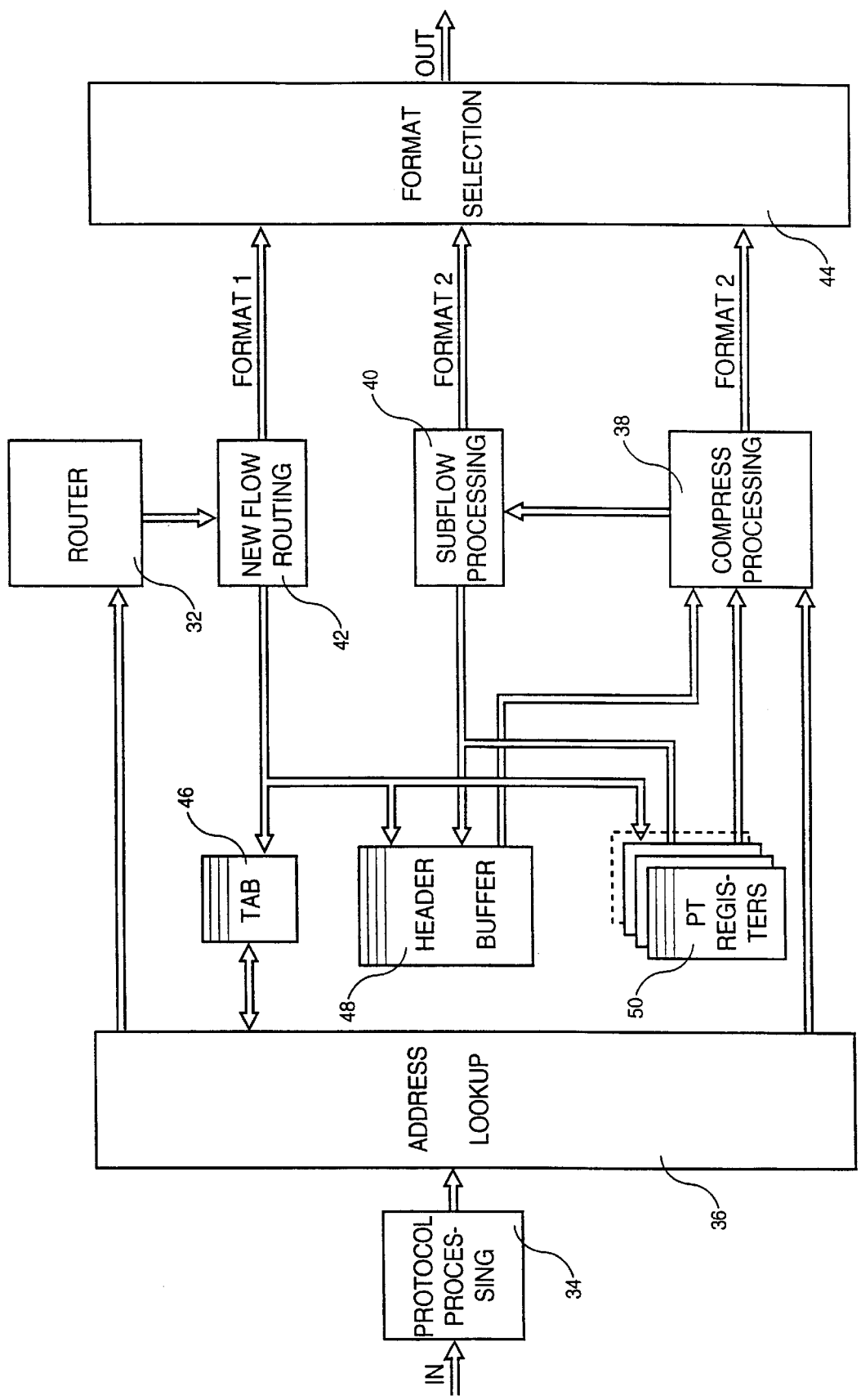
FIG. 2 is a block-diagram representing a system for transmitting compressed headers according to the method of the invention.

The block-diagram illustrated in FIG. 2 shows the different elements used for implementing the invention. The processing unit of ingress node 12 includes router 32, several modules which are Protocol Processing module 34, Address Lookup module 36, Compress Processing module 38, Subflow Processing module 40, New Flow Processing module 42, and Format Selection module 44, which are either hardware finite state machines or software modules. These modules may use several storage devices for storing the necessary information as explained later, which are a table TAB 46 containing the list of address fields used in the current flows of data, header buffer 48 containing all the reference headers or only the first 64 bytes of each which can be used for compressing a new frame header, and a number of PT registers 50 each being associated with an address field of TAB 46 and containing the pointers to reference headers to be used for compressing the new header.

Figure 3:
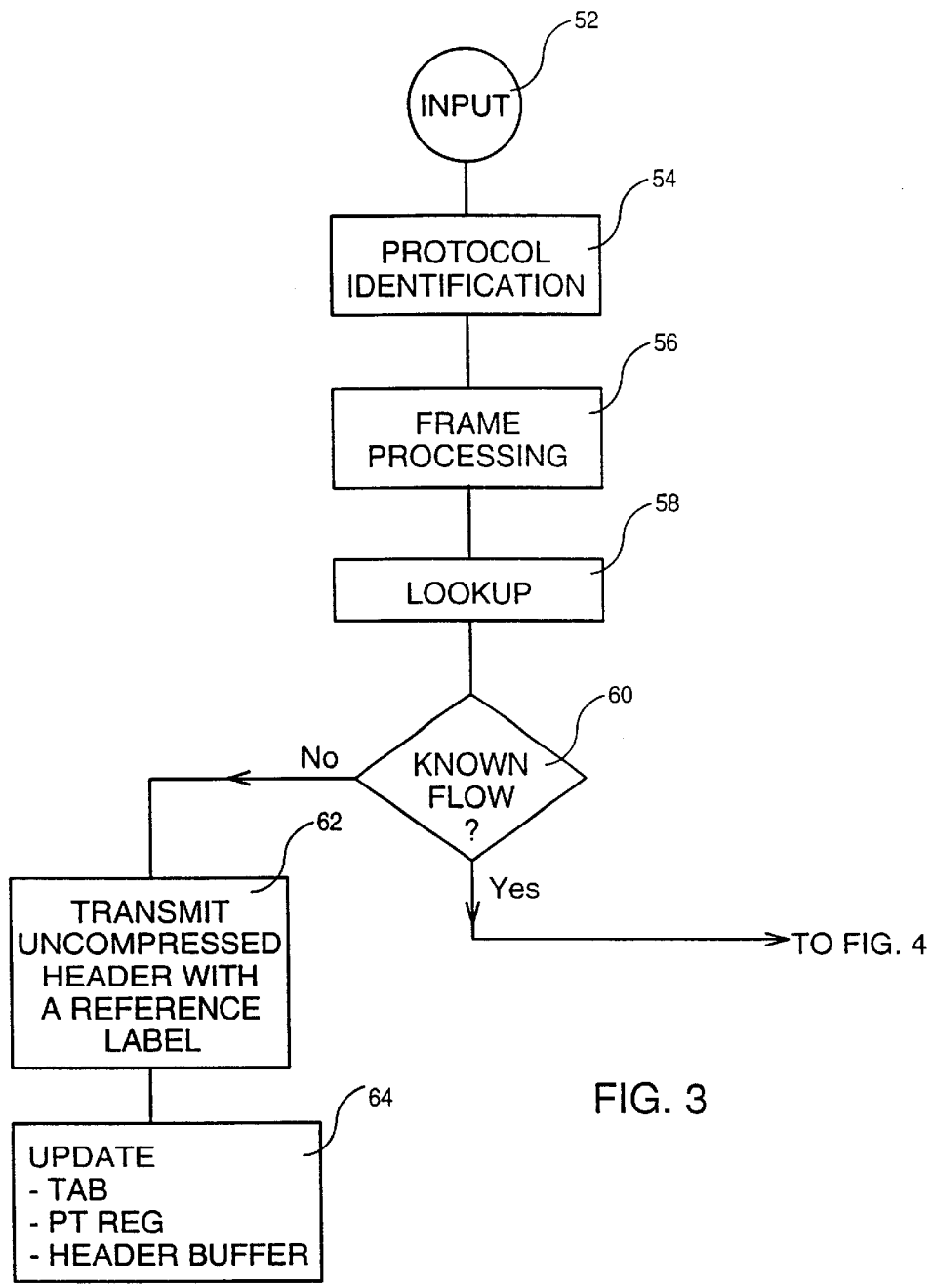
FIG. 3 is a flow chart of the method according to the invention which is used when the frame received by the ingress node is the first frame of a new flow of data.
Figure 4:
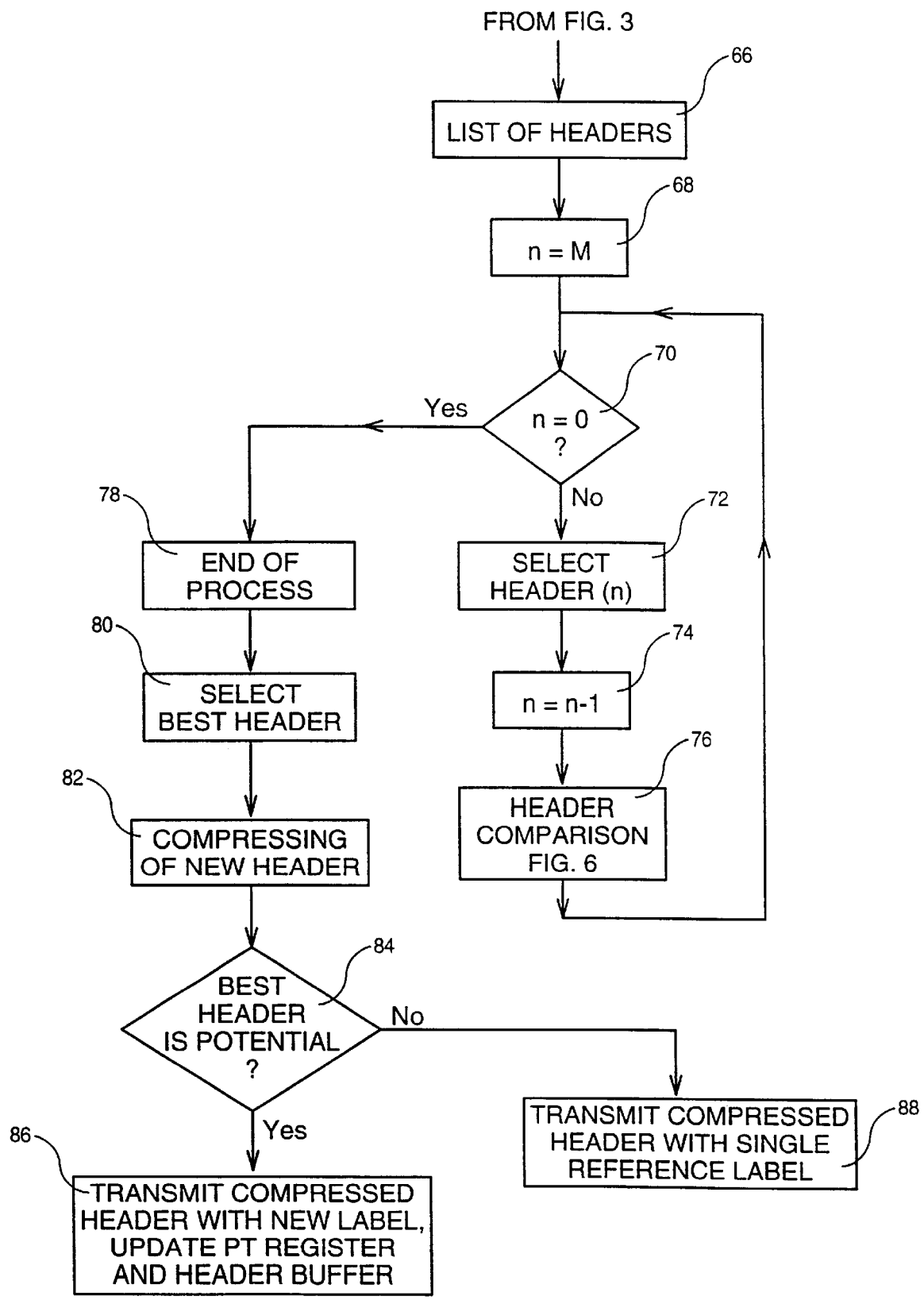
FIG. 4 is a flow chart of the method according to the invention which is used when the data frame to be compressed is not the first frame of the flow of data and there are already reference headers corresponding to the address field of the data frame.

The operation of the different elements of FIG. 2 is now described with reference to FIG. 3 and FIG. 4.

When a new frame is received (step 52) at the input (IN) of the ingress node, the Protocol Processing module 34 identifies (step 54) the protocol in order to determine whether the frame requires processing (step 56). For example, in protocol Ipv4 or IPv6, a field containing Time To Live (TTL) should be decremented. Furthermore, the address fields of the different protocols may have different locations in the header. Consequently, the identification of the protocol is useful in performing the next step of the process.

Then, a lookup is performed (58) by Address Lookup module 36 to determine whether the frame is a frame of a current flow of data or is the first frame of a new flow of data. This lookup is carried out by comparing the address field, which generally contains a source address field and a destination address field for the flow of data, with the contents of table TAB. Either the whole address field is compared by using a full match lookup or only the destination field (or at least the subnet part of this destination field) is compared by using a longest prefix matching method such as the method used by legacy routers.

If there is no entry in TAB 46 corresponding to the address field of the frame, this means that the flow is not known (step 60) and the frame pertains to a new flow of data, which is transmitted to Router 32. As usual, Router 32 determines the route or at least the output port of the node. A routed default label of this route is used as the first label followed by a newly assigned label which can be used later as a reference label by frames pertaining to this flow of data. The frame is then transmitted with an uncompressed header (step 62). The format selected by Format Selection module 44 to be transmitted over the data transmission network is designated as FORMAT 1, which is illustrated in FIG. 5A. Then, table TAB 46 is updated by storing the new address field, a pointer to this new reference header is stored in a PT register 50, and the complete header or the first 64 bytes are stored in Header Buffer 48 (step 64). It may not be necessary to store the address field of the header checked by the lookup when the address field of the current frame is identical in the reference header.

The method of compressing is now described with reference to FIG. 4 for the case wherein table TAB has an entry that corresponds to the address field of the new frame. In such a case a pointer PT is provided by TAB 46 to Address lookup module 36. Such a pointer is used to designate a PT register 50 giving the list of headers (step 66) which can be used as reference headers for the frame being processed. Such a list can include the addresses of the reference headers stored in Header Buffer 48 or can be the value of the flow identification fields (or labels) corresponding to these headers. In a preferred embodiment, the number of reference headers is limited to a number M, for example 8, corresponding to the maximum locations of the PT register designated by pointer PT which has been provided by the lookup function. In this embodiment, a variable n is set to M (step 68) and is decremented as the reference headers are retrieved from Header Buffer 48.

First, a test is made to determine whether n=0 (step 70). If not, a header (n) is selected (step 72), n is decremented to n−1 (step 74), and Compress Processing module 38 carries out a byte to byte comparison (step 76) between the header being processed and the selected reference header in order to determine a compression ratio associated with this reference header. The method of comparison is described in detail below with reference to FIG. 6.

Then, the steps 72, 74 and 76 are repeated until n=0 meaning that all the reference headers designated by the PT register associated with the output of table TAB have been compared with the header being processed.

When the variable n reaches the value 0, the process of header comparison is ended (step 78) and the best header is selected (step 80) from the list of reference headers which have been analyzed by considering the compression ratio associated with each reference header as explained below. Together with this selection, the compression ratio of the last frame header considered as a potential header is also computed.

Then, the processed header is compressed (step 82) with a method of compression based upon the comparison with the selected reference header or the potential header (last frame). This method consists of creating overhead bytes defining the position of the first byte in a sequence of consecutive bytes of the header to be compressed that are different from the corresponding bytes of the reference header, and the number of these different bytes. The position is defined with six bits whereas two bits are used to define the number of the consecutive bytes, that is one, two, or four bytes, since the number of bytes in a field is generally a power of two. The following exemplary encodings may be used:

00 is reserved
01 defines one byte
10 defines two bytes
11 defines four bytes

If there are more than four consecutive different bytes, one supplementary overhead byte and perhaps two supplementary bytes might be necessary.

Most of the headers have a length less than 64 bytes. However, for those headers which have more than 64 bytes it is preferable to limit the compression to an optimum number N, generally 64 bytes, and transmit the other bytes without compression.

In case the number of different bytes is too high and would require transmission of more bytes than the total number of bytes in the uncompressed header, it is preferable to stop the compression before reaching N bytes and to use an early stop field which will be the last field giving the position and the number of consecutive different bytes which have been compressed.

Accordingly, two cases may occur. Either the compression is stopped because there are too many different bytes as explained above, or there are no more bytes to be compressed after a byte which is not the last byte of the header. In both cases, a last overhead byte, which is called the End Of Header (EOH), includes six bits giving the position of the first uncompressed bytes and the two bits 00 which define the end of the compressed header.

The compressed header, which is preceded by a label of one to three bytes, is built by concatenating several fields including each of the overhead bytes created as described above followed by the different bytes for which the overhead bytes have been created, up to the field giving the position of the first uncompressed byte. This last field is followed by the CRC or checksum, which is computed using the uncompressed value of all the bytes of the header up to the last byte of the compressed header.

As already mentioned, the compression ratio with respect to the last frame has been computed at step 80 together with the compression ratios resulting from the reference headers. A test is made (step 84) to determine whether the last frame header is the best reference.

If so, the Compress Processing module 38 activates the Subflow Processing module 40 in order to add a subflow which considers the potential header as the reference header and assigns a label. A compressed header of FORMAT 2, which is illustrated in FIG. 5B, is selected by Format Selection module 44 to be transmitted (step 86). Because such a header corresponds to a new subflow, it is preceded by a subflow default label in order to warn the egress node that there is a subflow addition. This default label is followed by a newly assigned label which will be the reference label in the next frame and which can be used as a reference label for the following frames. Then, the newly assigned label is followed by the reference label which defines the header which has been used as reference to obtain the compressed header which follows the reference label.

Note that the advantage of transmitting a default label and the newly assigned label together with the reference label is to allow transmission of the current header being compressed despite the change of reference header on the one hand, and to enable the egress node to store the current header as reference header for the next frame on the other hand.

Together with the transmission of the FORMAT 2 header, header buffer 48 is updated by storing therein the potential header (which will be used as a reference header). PT register 50 corresponding to the address field of the current frame is updated by storing therein the address of the potential header in the header buffer. It must be noted that, if PT register 50 associated with the address field of the frame is limited to a predefined number of reference headers to be selected, it will be necessary to remove one or more references when the register is full. This can be done by using some criteria such as the age of the reference header.

If the last frame header is not the best reference header, Compress Processing module 38 provides the FORMAT 3 header, which is illustrated in FIG. 5C, to be transmitted (step 88). In this format, the label preceding the compressed header designates the same reference header as previously.

The header comparison (step 76 of FIG. 4) between the header to be compressed and the reference headers is now described with reference to FIG. 6, wherein:

n is the byte number in the header
c is the number of consecutive different bytes
v is the number of overhead bytes being created
w is the number of different bytes At the beginning of the comparison process, the variables n, c, v and w are initialized to 0 (step 90). The first step of the process is to increment variable n (step 92). Then a test is made (step 94) to determine whether n has reached a value N which is the maximum number of bytes that can be compared. This value, set to 64 in the preferred embodiment, depends on the storage capacity for the various headers and on the protocols being used.

If n has not reached value N, a new test is made (step 96) to determine whether the $n^{th}$ byte Bn of the header to be compressed is identical to the $n^{th}$ byte Rn of the reference header. If not, variable w is incremented to w+1 (step 98) and a test is made to check whether the sum v+w has reached the limit N (step 100). When the sum has reached the limit N, this means that the total number of created overhead bytes and different bytes which both are included in the compressed header is already equal to the number of bytes in the uncompressed header. Therefore, it is useless to continue the process, which is stopped (step 102), and all the variables are registered as described below.

If v+w remains less than the limit value N, the variable n, the different byte Bn (which is to be transmitted in the compressed header), and the sum v+w are registered in a DELTA list (step 104). Then c is incremented to c+1 (step 106) and the process returns to the beginning where n is incremented to n+1 (step 92), and n is compared with N (step 94). Again, the new byte Bn is compared with byte Rn of the reference header and the same loop is executed if the two bytes are different. This loop is repeated by incrementing c to c+1 (step 106) as long as there are consecutive bytes of the header to be compressed which are different from the corresponding bytes of the reference header. However, in an alternative embodiment, the value c could be limited to eight and, in such a case, a test should be made to check whether c has reached the value of eight.

When the byte Bn of the header to be compressed is identical to the byte Rn of the reference header, the overhead bytes are built through several steps starting by defining the two values q and r as the quotient and the remainder, respectively, of the division of variable c by four (step 108). The divider is four because two bits are used to define the number of consecutive different bytes in the overhead byte. As mentioned above, the following exemplary two-bit encodings may be used: 01 (one byte), 10 (two bytes) and 11 (four bytes). Then, a test is made (step 110) to check whether the remainder r is greater than one. If so, variable v is incremented to v+(q+r−1) (step 112). Thus, v is incremented to v+1 when c=2, to v+2 when c=3, to v+2 when c=6 and to v+3 when c=7.

If the remainder r is less than or equal to one, v is incremented to v+(q+r) (step 114). Thus, v is incremented to v+1 when c=1 or c=4, and is incremented to v+2 when c=5 or c=8.

Then c is reset to 0 (step 116) and the process returns to the beginning of the loop where n is again incremented to n+1 and the same process as described above is executed. Note that when n reaches the limit value N, for example 64 (step 94), the process of comparison is ended (step 102).

Figure 6:
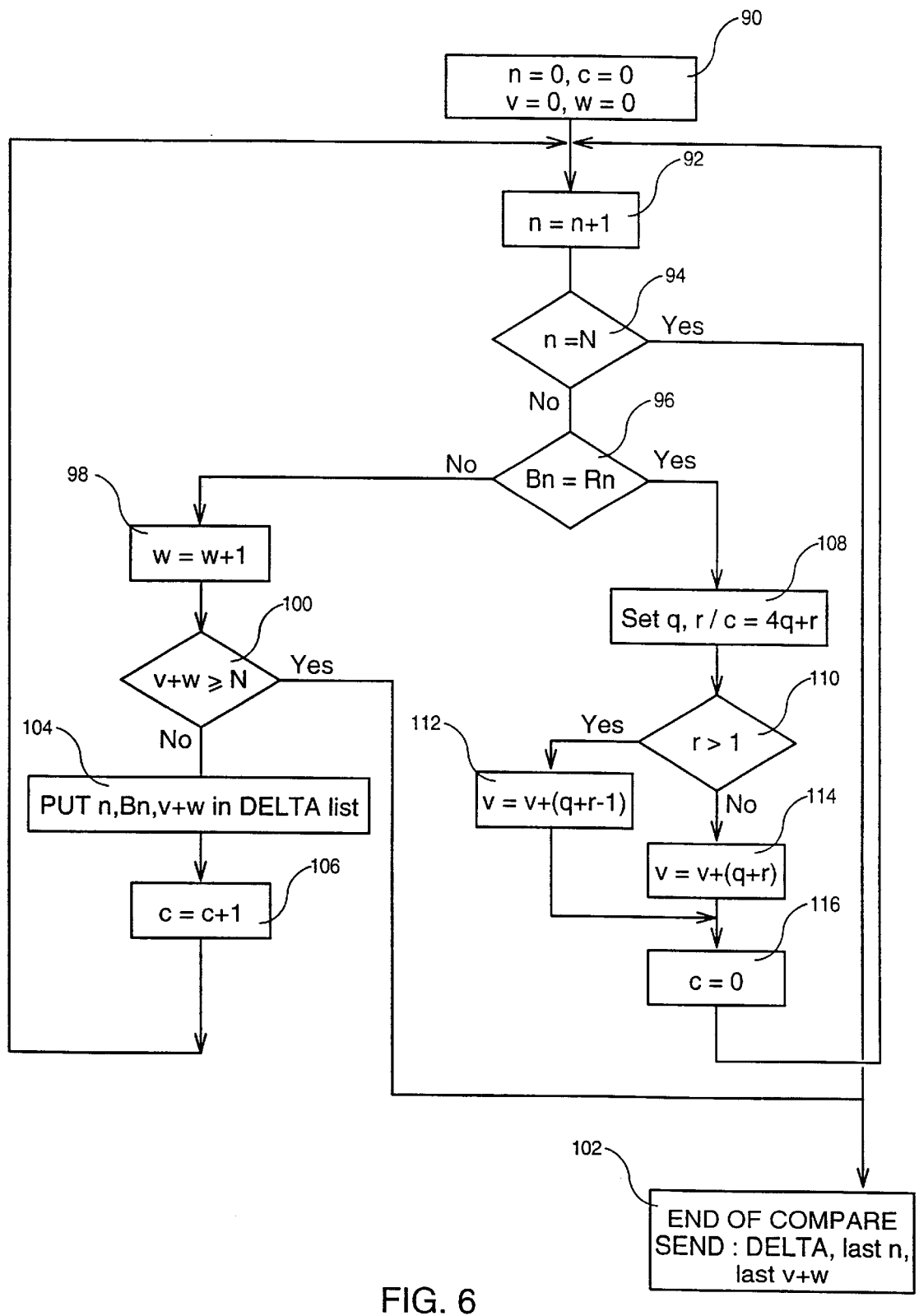
FIG. 6 is a flow chart of the process of header comparison used for selecting a reference header in the method according to the invention.

When the sum v+w ³ N or when n=N, the comparison process illustrated in FIG. 6 is ended. The list DELTA together with the last value of n and the last value of v+w are processed to select the best reference header. The best reference header corresponds to the maximum value of n−(v+w)n as explained below. It is possible to compute the number of effective bytes, for each value of n, that would be transmitted if the process of comparison were stopped for this value of n. This number includes the number v of overhead bytes, the number of different bytes w, and the number of the remaining bytes to be all transmitted from position n+1 to N, that is N−n. Therefore, the total number of bytes to be transmitted for n is:

$$NT=(v+w)n+N-n$$

NT starts from value N and generally should decrease to a minimum value which corresponds to a maximum value of n−(v+w)n.

Accordingly, for each value of n, the maximum value of n−(v+w)n is determined from the DELTA list. It must be noted that there could be several maximum values, in which case the greatest maximum value is selected, or the maximum is reached only for the last n, meaning that there are no remaining bytes in the header which will not be compressed.

The maximum value of n−(v+w)n thus determines the optimum n for which the compression ratio is maximum. This ratio is computed as tau =N/(NT). It is therefore maximum when NT is minimum, that is for the maximum value of n−(v+w)n. As already mentioned, this compression ratio is also computed for the potential header. If the ratio for the potential header is better than the ratio computed for each reference header, the potential header becomes the reference header for the next data frames as explained above with reference to FIG. 4 and FIG. 5B.

As mentioned earlier with reference to FIG. 1, each flow of data has the same egress node 14 or 16 as destination node. This destination node must know the reference header which has been used by the ingress node. For this, the destination node has a header buffer which is identical to the header buffer 48 of the ingress node. When the ingress node transmits a first frame without compression, the format of the frame corresponds to FORMAT 1 of FIG. 5A. The uncompressed header is stored in the header buffer and the egress node recognizes the new label assigned as a reference label for the next frame which corresponds generally to FORMAT 3 of FIG. 5C. In such a case, the reference header is retrieved from the header buffer and a decompressed header is built by using the reference header and the compressed header of the data frame being received. The decompressed header is checked using the CRC transmitted at the end of the compressed header as explained above. The decompressed header is then stored as a potential header for the frames having the same reference label.

When the egress node receives a frame having FORMAT 2, this means that the potential header (last frame) has been selected as a reference header. The frame is decompressed using the same process as above, but the egress node stores the potential header as the new reference header for the next frames associated with the new label assigned as new reference label.

As mentioned at the beginning of this specification, the method implemented by the invention can be applied independently of the transmission protocol, even when an unknown protocol is used. In such a case, a byte to byte comparison is performed without a preliminary lookup of the address field since the protocol has not been identified. The frame is transmitted as described above, but the header has to be decompressed and compressed again at each switching node of the network insofar as there is no determination of an address field corresponding to a destination address.

What is claimed is:

1. A method for transmitting data frames with compressed headers in a multiprotocol data transmission network comprising at least one ingress node and a plurality of switching nodes wherein said ingress node transmits flows of data to at least one of said switching nodes used as egress nodes, each flow of data being composed of frames composed of data bytes and a header including information which defines protocols associated with the various layers involved in said flow of data; said method comprising the steps of:

a) each time a data frame is received by said ingress node for transmission over said network to an egress node, comparing an address field of the data frame to a list of address fields corresponding to the current flows of data, b) selecting all the candidate headers associated with the flows of data having the same address field, c) determining a compressed header of the frame header for each of said candidate headers based upon the position and the number of different bytes between said frame header and said candidate header, d) selecting as reference header the one amongst said candidate headers for which the compressed header has the best compression ratio, and e) transmitting a compressed data frame wherein the data bytes of the data frame received by said ingress node are preceded by a reference label associated with said reference header and a compressed header including a field defining the position and the number of consecutive bytes in the portion being compressed which are different from the bytes of said reference header, a field including said different bytes and a field including the portion of header which is not compressed.

2. The method according to claim 1, wherein step a) of comparing is performed by using either a full match lookup or a longest prefix matching method.

3. The method according to claim 2, wherein step b) includes selecting all the candidate headers which are associated with the flows of data having the same destination field.

4. The method according to claim 1, wherein step c) comprises the following steps:

c1) determining by comparison the bytes (Bn) in the header of the received data frame which are different from the corresponding bytes (Rn) of said candidate header, c2) determining the number (w) of said different bytes, c3) determining the number (v) of overhead bytes which are required to define the position and number of said consecutive different bytes, and c4) stopping step c) when either all the bytes of the header of said received data frame have been compared to the bytes of said candidate header or the sum v+w has become greater than or equal to the number (N) of bytes in said header.

5. The method according to claim 4, wherein each of said overhead bytes contains the position of the first byte in a sequence of consecutive different bytes in the header of said received data frame and the number of bytes which are different in said sequence.

6. The method according to claim 5, wherein two bits of said overhead byte are used to define the number of consecutive different bytes, said bits being 01 for one different byte, 10 for two different bytes and 11 for four different bytes.

7. The method according to claim 6, wherein a last overhead byte is used to define the position of the last byte of the header portion being compressed, said last overhead byte containing two bits 00 in place of said two bits defining the number of consecutive different bytes.

8. The method according to claim 4, wherein step d) comprises the following steps:

d1) determining for each of said candidate headers, the minimum value of NT=(v+w)n+N−n which represents the number of bytes included in the compressed header, d2) determining a compression ratio for each of said candidate headers, as being the ratio N/NT, and d3) selecting the one of said candidate headers as reference header for which said compression ratio is the most important.

9. The method according to claim 4, wherein step e) includes transmitting a compressed data frame wherein said compressed header comprises said overhead bytes, said different bytes and said portion of the header which is not compressed.

10. The method according to claim 1, wherein the header of the last data frame before the received data frame is also considered as a candidate header to be a reference header for the next data frame transmitted over said network.

11. The method according to claim 10, wherein a new label defining said header of the last frame as reference header is transmitted together with said reference label to inform said egress node that the new label will be the reference label for the next data frame.

12. The method according to claim 1, further comprising a step preceding step a) of identifying the protocol being used in the received data frame to determine the location of said address field in the header of said frame.

13. The method according to claim 1, wherein the header of said received data frame is transmitted without being compressed when there is no matching between the address field of said header and said list of address fields, a new label being assigned to define said uncompressed header and to be used as reference label in the next data frame.

14. A system for transmitting data frames with compressed headers in a multiprotocol data transmission network comprising at least one ingress node and a plurality of switching nodes wherein said ingress node transmits flows of data to at least one of said switching nodes used as egress nodes each flow of data including frames of data bytes and a header including information which defines protocols associated with the various layers involved in said flow of data; wherein said ingress node comprises:

address lookup means for comparing the address field of a data frame received by said ingress node for transmission over said network to a list of address fields;

first selecting means for selecting in a header buffer all the candidate headers associated with the flows of data having the same address field, determining means for determining a compressed header of the frame header for each of said candidate headers based upon the position and the number of different bytes between said frame header and said candidate header, second selecting means for selecting as a reference header the one amongst said candidate headers for which the compressed header has the best compression ratio, and transmitting means for transmitting a compressed data frame wherein the data bytes of the data frame received by said ingress node are preceded by a reference label associated with said reference label and a compressed header including a field defining the position and the number of consecutive bytes in the portion being compressed which are different from the bytes of said reference header, a field including said different bytes and a field including the portion of header which is not compressed.

15. The system of claim 14, wherein said ingress node further comprises a plurality of registers each one being associated with an address field stored in said list of address fields and containing a list of pointers used for addressing said header buffer in order to select said candidate headers.

16. The system of claim 14, wherein said determining means comprises:

means for determining the bytes (Bn) in the header of the received data frame which are different from the corresponding bytes (Rn) of said candidate header, means for determining the number (w) of said different bytes, means for determining the number of overhead bytes which are required to define the position and number of said consecutive different bytes, and means for detecting when either all the bytes of the header of said received data frame have been compared to the bytes of said candidate header or the sum v+w has become greater than or equal to the number (N) of bytes in said header.

17. The system of claim 16, wherein two bits of said overhead byte are used to define the number of consecutive different bytes, said bits being 01 for one different byte, 10 for two different bytes and 11 for four different bytes.

18. The system of claim 14, wherein a last overhead byte is used to define the position of the last byte of the header portion being compressed, said last overhead byte containing two bits 00 in place of said two bits defining the number of consecutive different bytes.

19. The system of claim 14, wherein said second selecting means comprise:

means for determining for each of said candidate header, the minimum value of NT=(v+w)n+N−n which represents the number of bytes included in the compressed header, means for determining a compression ratio for each of said candidate headers, as being the ratio N/NT, and means for selecting the one of said candidate headers as reference header for which said compression ratio is the most important.

20. The system of claim 14, wherein the header of the last data frame before the received data frame is also considered as a candidate header to be a reference header for the next data frame transmitted over said network.

21. The system of claim 20, wherein a new label defining said header of the last frame as reference header is transmitted together with said reference label to inform said egress node that the new label will be the reference label for the next data frame.

22. The system of claim 14, further comprising protocol processing means for identifying the protocol being used in the received data frame and determining the location of said address field in the header of said frame.

23. The system of claim 14, wherein said transmitting means transmit the header of said received data frame without being compressed when there is no matching between the address field of said header and said list of address fields, a new label being assigned to define said uncompressed header and to be used as reference label in the next data frame.

* * * * *